United States Patent [19]

Mehnert et al.

[11] Patent Number: 5,565,769
[45] Date of Patent: Oct. 15, 1996

[54] POSITION DETECTOR TAKING ITS OPERATION ENERGY FROM THE BODY MONITORED BY IT

[76] Inventors: Walter Mehnert, Grillparzer Strasse 6, 85521 Ottobrunn; Thomas Theil, Alte-Traubinger-Strasse 5, 82340 Feldafing, both of Germany

[21] Appl. No.: 352,101

[22] Filed: Nov. 30, 1994

[30] Foreign Application Priority Data

| Dec. 2, 1993 | [DE] | Germany | 43 41 147.9 |
| Dec. 9, 1993 | [DE] | Germany | 43 42 069.9 |
| Apr. 16, 1994 | [DE] | Germany | 44 13 281.6 |

[51] Int. Cl.$^6$ .............. G01B 7/14; G01B 7/30; G01B 7/02; G01D 5/244
[52] U.S. Cl. .............. 324/207.15; 324/207.22; 324/262
[58] Field of Search .............. 324/173, 174, 324/207.11, 207.12, 207.15, 207.22, 262, 207.24, 207.25

[56] References Cited

U.S. PATENT DOCUMENTS

| 3,826,985 | 7/1974 | Wiley . | |
| 4,470,010 | 9/1984 | Sears | 324/157 |

FOREIGN PATENT DOCUMENTS

| 581151 | 2/1994 | European Pat. Off. . |
| 479525 | 10/1994 | European Pat. Off. . |
| 2221371 | 11/1973 | Germany . |
| 2514131 | 11/1978 | Germany . |
| 2935965 | 7/1981 | Germany . |
| 3034442 | 4/1982 | Germany . |
| 8206731 | 7/1982 | Germany . |
| 2817169 | 10/1986 | Germany . |
| 3720086 | 1/1988 | Germany . |
| 4306487 | 9/1993 | Germany . |
| WO8804780 | 6/1988 | WIPO . |

OTHER PUBLICATIONS

Patent Abstracts of Japan, vol. 12, No. 173, May 24, 1988 & JP-A-62 285012 Dec. 10, 1987.

*Primary Examiner*—Walter E. Snow
*Attorney, Agent, or Firm*—Sughrue, Mion, Zinn, Macpeak & Seas

[57] ABSTRACT

A position detector operable to detect the position of a moving body by generating an electrical signal and feeding it to an electronic processing means whenever the moving body reaches a predeterminable position has an energy storage means which, when the body approaches the predeterminable position, accumulates and stores a part of the kinetic energy of the body in the form of potential energy and, when said predeterminable position is reached, abruptly liberates the stored potential energy in the form of kinetic energy. The detector further has a means for conversion of the kinetic energy into an electrical energy pulse which is fed to the electronic processing means, whereby the electronic processing means operates reliably even when its regular power supply has failed and the moving body is approaching the predeterminable position at a very low speed.

26 Claims, 4 Drawing Sheets

5,565,769

POSITION DETECTOR TAKING ITS OPERATION ENERGY FROM THE BODY MONITORED BY IT

FIELD OF THE INVENTION

The invention concerns a position detector.

BACKGROUND OF THE INVENTION

A typical situation where a position detector is used is for example as a component in a revolution counter or tachometer which outputs an electrical pulse and evaluates and stores it electronically, whenever a rotating shaft passes through a preselected angular position.

An example of a situation of use of such a revolution counter is in connection with machine tools in which a coarse measurement value in relation to the position of the tool holder carriage or slide is obtained by counting off the number of revolutions of the spindle which displaces the carriage or slide. A problem arises in that situation by virtue of the fact that, in the event of the power supply for the electronic processing system being switched off or failing, the coarse measurement value in respect of the carriage position should not be lost and should be immediately available again after the power supply is switched on again, even if, during the period for which there was no power, the spindle was rotated for example by hand through one or more revolutions.

The state of the art affords two different basic kinds of position detector for dealing with that problem. In the first alternative configuration, coupled to the rotating shaft or spindle is a step-down transmission assembly whose output shaft rotates through a maximum of 360° when the tool holder carriage passes over its entire adjustment length. The output shaft of the step-down transmission assembly is monitored by an absolute encoder which delivers an output signal which identifies the respective instantaneous angular position of the output shaft of the step-down transmission assembly and can thus serve as the coarse measurement value in respect of the instantaneous position of the carriage. Particularly when the arrangement involves long displacement travels, so that the spindle has to perform a large number of revolutions in order to cover those displacement travels, the step-down transmission assembly and the absolute encoder must satisfy extremely high levels of requirement in respect of accuracy. The play in the step-down transmission assembly must be kept so small that the uncertainty which occurs upon a reversal in the direction of rotation of the spindle is less than the angle which the absolute encoder resolves, for detecting a revolution of the spindle. It is clear that a step-down transmission assembly with absolute encoder, in order to detect a step-down ratio of for example 4000:1, requires a high level of apparatus expenditure that gives rise to correspondingly high overall costs. In addition, because of their high mass moment of inertia, such transmission assemblies are not suitable for average or high levels of acceleration and speeds of rotation.

Another alternative configuration involves designing a simple optical or magnetic detector in such a way that, whenever a marking on the rotating shaft rotates past the detector, the detector outputs an electrical signal which is fed to the electronic processing system. That arrangement is supplied with power by means of a battery so that it is independent of the main power supply of the machine tool. Although such a revolution counter involves a substantially lower level of manufacturing cost than the first alternative discussed above, it does however suffer from the disadvantage that it requires the batteries to be continuously monitored and changed in good time as required.

SUMMARY OF THE INVENTION

An object of the present invention is to provide a position detector which while being of a simple mechanical structure affords an adequately high level of accuracy.

Another object of the present invention is to provide a position detector which when a moving body reaches a predeterminable position outputs with a high degree of reliability a sufficiently large electrical pulse even when the moving body approaches the predetermined position at an extremely low speed and in particular a speed tending towards zero.

A further object of the present invention is to provide a position detector which is based on a simple operating procedure but which affords an enhanced level of sensitivity.

In accordance with the present invention the foregoing and other objects are achieved by the invention set forth herein.

As will be seen in greater detail from the following description of preferred embodiments, the position detector according to the present invention is based on the consideration that it is possible for a part of the kinetic energy of the moving body to be tapped off and used not only to generate the signal pulse but also for the power supply for the electronic evaluation assembly which processes the pulse. However a simple generator which converts a part of the kinetic energy of the moving body directly into electrical energy suffers from the disadvantage that, with a very slow movement of the moving body and thus a slow approach to the predetermined position, the generator supplies only a very small value of $d\phi/dt$ so that there is not sufficient voltage and/or current available for the electronic processing assembly. In order to overcome that problem, in accordance with the invention there is provided an energy storage means which provides for collecting over a certain period of time of energy components or portions which are tapped off from the kinetic energy of the moving body, and cumulatively stores the tapped-off energy. While therefore the moving body slowly approaches the predetermined position, upon the attainment of which a signal is to be triggered off and the electronic processing assembly is to be supplied with energy, a part of its kinetic energy is already being continuously charged into the energy storage means, in the form of potential energy. When then the moving body has reached the predetermined position, that potential energy is abruptly liberated and converted into kinetic energy of an element which is a component of the generator which generates the desired electrical energy. Because of the high level of acceleration and the high speed of that element, which can be achieved as a result, it is possible to achieve a value of $d\phi/dt$, which supplies an amount of electrical power which is fully adequate for the desired purpose.

Preferably, the mass moment of inertia of the moving parts is kept as small as possible in order to make it possible to achieve high speeds.

Preferably, the element which is accelerated to a high speed when the stored potential energy is abruptly liberated includes a permanent magnet which, for example when it has reached its maximum speed, moves past an induction coil in order to induce therein the desired electrical pulse. In its main part, that pulse comprises a positive and a negative half-wave with very steep edges, wherein the sequence in which those half-waves occur depends on the winding direction of the coil and also on whether the magnet moves past the coil with its North pole or its South pole.

In many cases half-wave rectification may be sufficient to provide the supply voltage required for the electronic processing assembly, in particular for writing a detected revolution count value into a permanent storage means. If that should not be enough, it is also possible to use the voltage difference between the two half-wave peaks, by virtue of full-wave rectification. Even higher voltages can be achieved by a plurality of capacitors which are initially connected in parallel being charged with the dc voltage obtained from the induced pulse, the capacitors then being connected in series for the supply of voltage and current to the electronic evaluation assembly. A necessary requirement in that respect is that the voltage which is obtained directly from the induced pulse is adequate for actuating the switching logic, for example for switching over the capacitors from the parallel-connection configuration to the series-connection configuration. If an intermediate part is of sufficiently small inertia, the first half-wave of the main part of the pulse contains substantially more energy than is required for the electronic evaluation assembly for effecting the storage procedure. It is therefore possible in principle if desired for the induction coil to be already short-circuited during the part of that half-wave which occurs later in terms of time, in order rapidly to decelerate the intermediate part. Preferably however the second half-wave is used for that purpose.

In the event that the electronic processing assembly can be fed from its regular power supply source, it is possible for the energy storage means to be decoupled from the moving body in such a way that it no longer takes and collects components of the kinetic energy of the moving body. In that 'regular mode of operation', the position detector according to the invention is then completely reaction-free.

Conversely however it is also possible to envisage situations of use in which the electronic processing assembly receives all its electrical energy exclusively from a position detector in accordance with the invention, or the position detector according to the invention is used only to provide the supply of power to the electronic processing assembly and possibly for obtaining information about the direction of movement of the moving body while an additional sensor which may be for example and preferably a capacitive sensor is provided for determining the position of the moving body.

Further objects, features and advantages of the present invention will be apparent from the following description of a preferred embodiment thereof.

DESCRIPTION OF PREFERRED EMBODIMENTS

Figure 1:
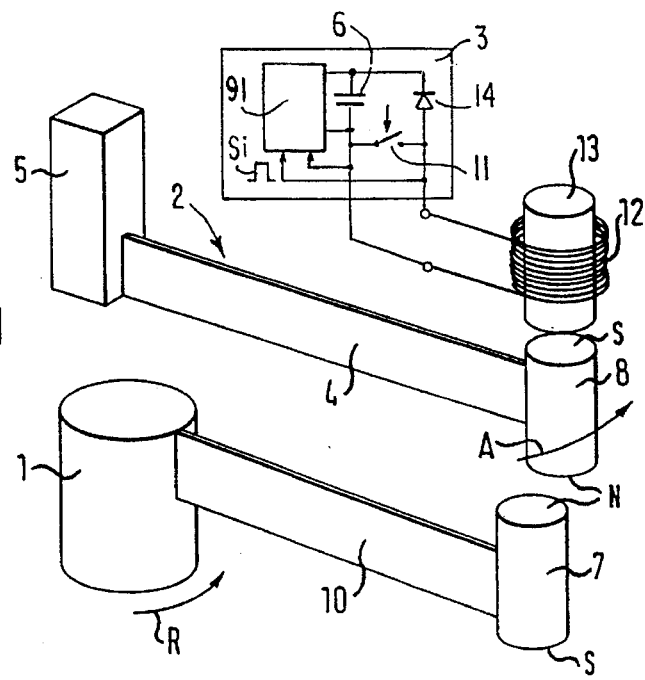
FIG. 1 is a highly diagrammatic view showing the structure of a position detector according to the invention which is suitable for use as a revolution counter and which has an energy storage means in the form of a leaf spring.

Referring first to FIG. 1, reference numeral 1 therein denotes a moving body whose position to be detected, in the form of a rotary shaft which is rotatable in the direction indicated by the arrow R. In order to be able to count the revolutions of the shaft 1 even when an electronic evaluation circuitry 3 is separated from its regular power supply (not shown) and the shaft 1 is moving only very slowly, the illustrated construction includes an energy storage means 2 which in the present case is formed by a leaf spring 4. One end of the leaf spring 4 is clamped to a non-rotatably holder 5 in such a way that the leaf spring 4 extends in a radial direction approximately from the axis of rotation of the shaft 1.

In order that the energy storage means 2 can collect and store a part of the kinetic energy of the moving body or rotating shaft 1, as the moving body approaches a predeterminable position, that is to say in the present case as the rotating shaft 1 approaches a predeterminable angular position, the assembly has an entrainment means which deflects the free end of the leaf spring 4 over a given angle in the peripheral direction, that is to say in the direction indicated by the arrow A, from the initial position of the leaf spring 4 as shown in FIG. 1, while the shaft 1 approaches the predeterminable angular position.

In the position detector shown in FIG. 1, the entrainment means is formed by first and second permanent magnets 7 and 8, of which the one permanent magnet 7 is non-rotatably connected to the shaft 1 by way of a stiff carrier 10 extending radially relative to the axis of rotation of the shaft 1, and is oriented in such a way that its North/South direction is approximately parallel to the shaft 1. The second permanent magnet 8 is fixed to the free end of the leaf spring 4 in such a way that it is directed with its North/South direction as accurately as possible in anti-parallel relationship with the permanent magnet 7.

The radial length of the carrier 10 is so selected that, by virtue of the rotary movement of the shaft 1, the permanent magnet 7 passes as accurately as possible beneath the permanent magnet 8. In that respect the axial spacing between the two magnets 7 and 8 is kept very small. When the permanent magnet 7 approaches the permanent magnet 8, the latter is repelled because of the anti-parallel orientation thereof. As the carrier 10 and the leaf spring 4 has a high level of stiffness in the axial direction, the permanent magnet 8 deflects in a radial direction, that is to say in the direction indicated by the arrow A, whereby the leaf spring 4 is bent and is increasingly stressed. In that way a part of the kinetic energy of the rotating shaft 1 is accumulated and stored in the form of potential spring energy.

As the restoration or return force of the leaf spring 4 increases with increasing deflection thereof, as the shaft 1 progressively increasingly rotates in the direction indicated by the arrow R a deflection position will be reached in which the return force of the leaf spring 4 overcomes the repulsion forces, which are acting in the peripheral direction, as between the permanent magnets 7 and 8, so that the permanent magnet 8 is strongly accelerated over a curved path which is defined by the length of the leaf spring 4, back in a direction towards the starting position shown in FIG. 1, that is to say, in the opposite direction to the direction indicated by the arrow A. In that way the potential energy stored in the leaf spring 4 in converted into kinetic energy.

When the starting position shown in FIG. 1 is reached again, the permanent magnet 8 is moving at its maximum speed so that it moves beyond that position, travelling in the opposite direction to the direction indicated by the arrow A. When that happens, the leaf spring 4 is bent back until the kinetic energy is converted again into potential energy. In that way, in principle, the permanent magnet 8 can reciprocate a plurality of times through the initial position shown in FIG. 1, until the damping effect present causes the energy originally stored in the leaf spring 4 to be converted into heat, and the permanent magnet 8 comes to rest again in the starting position shown in FIG. 1.

In order for the kinetic energy contained in the permanent magnet 8 in the first spring-back movement thereof to be converted into an electrical energy pulse, the position detector has an induction coil 12 wound on to an iron core 13 which is non-rotatably arranged in the vicinity of the starting position of the permanent magnet 8 shown in FIG. 1, so that, when the permanent magnet 8 passes through that illustrated starting position, the magnetic flux which passes through the iron core 13 changes in a very short time. As a result of the high dφ/dt generated, induced in the induction coil 12 is a voltage which is fully sufficient to charge up by means of a half-wave rectifier 14 for example a capacitor 6 which serves as a current/voltage source for the electronic processing circuitry 9 and which at least enables it to raise by one count value an electronic counter for counting off the revolutions through which the shaft 1 is rotating. Therefore the electrical energy pulse generated in the induction coil has two functions: it serves on the one hand as a signal pulse 3; which indicates that the rotating shaft 1 has passed through a given predetermined position, and at the same time it serves as an energy supply for the electronic processing circuitry 9 for evaluating the signal pulse 3.

The circular-cylindrical iron core 13 shown in FIG. 1 would result in only comparatively weak magnetic coupling with the permanent magnet 8 and thus only a low variation in induction flux dφ/dt. Preferably therefore the iron core is of an E-shaped configuration, as will be described in greater detail hereinafter with reference to FIG. 5. In the present embodiment an E-shaped iron core is arranged in such a way that the three limbs of the E-shape extend in the axial direction in the same manner as is illustrated for the cylindrical iron core 13.

As soon as the induction coil 12 has produced sufficient electrical energy to provide for the above-described signal evaluation and energy storage functions, the outputs thereof can be short-circuited by means of a controllable switch 11 which decelerates the reciprocating movement of the permanent magnet 8 beneath the iron core 13 so greatly damped that the permanent magnet quickly returns to the starting position shown in FIG. 1. It is possible for the system consisting of the leaf spring 4 and the permanent magnet 8 to be so heavily damped that, when it returns from the first deflection position into the starting position shown in FIG. 1, the permanent magnet 8 moves through that starting position by only a very small distance, and very quickly comes to rest after it has swung back.

Instead of the described entrainment means which operates with two permanent magnets 7 and 8, for coupling the energy storage means 2 to the rotary movement of the shaft 1 from time to time, it is in principle also possible to provide a purely mechanical entrainment means. Then, when the carrier 10 reaches the position shown in FIG. 1, the mechanical entrainment means comes into engagement with the leaf spring 4 in the region of its free end and deflects the leaf spring 4 in the above-described manner over a predeterminable angular range in order then abruptly to release it. As however such a mechanical entrainment and coupling assembly is likely to be subjected to a high rate of wear, in particular when in normal operation the shaft 1 rotates at high speeds of rotation, the magnetic coupling and entrainment system shown in FIG. 1 is to be preferred.

Figure 2:
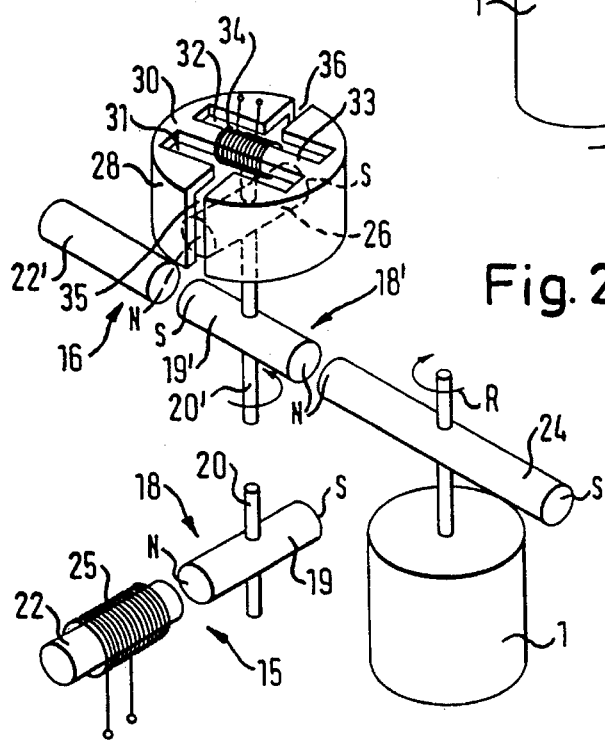
FIG. 2 is also a highly diagrammatic view showing the structure of a position detector according to the invention which is suitable for use as a revolution counter and which has energy storage means which are each formed by a respective magnet arrangement.

Reference will now be made to FIG. 2 showing another embodiment of a position detector according to the invention. The position detector shown in FIG. 2 also serves reliably to count the revolutions of a moving body in the form of a rotary shaft 1, even when the shaft 1 is rotating at a very low speed and the regular power supply for the electronic evaluation assembly has failed or is switched off. In order moreover to be able to detect the direction of rotation of the shaft 1, the arrangement shown in FIG. 2 has first and second energy storage and detector units 15 and 16 which in principle can be identical in structure. It will be seen accordingly that FIG. 2 shows two units 15 and 16 which are of different design configurations, in order in this simple manner to be able to show different possible designs of the units 15 and 16.

Both of the energy storage and detector units 15 and 16 include an intermediate portion as identified at 18 and 18' respectively. Each of the intermediate portions 18 and 18' has a respective permanent magnet 19 and 19' which is mounted rotatably about an axis parallel to the axis of the shaft 1, as indicated by the mounting shafts 20 and 20'. The shafts 120 and 20' are disposed at locations on a circular arc which is concentric relative to the axis of rotation of the shaft 1, at an angular spacing from each other of about 90°. Disposed still further radially outwardly from the shaft 1 and directed radially relative to the axis of rotation of the shaft 1 are first and second bar-like elements 22 and 22' of ferromagnetic material, which are here formed by soft-iron bars. The soft-iron bars 22 and 22' are non-rotatably mounted in such a way that they are each disposed with their respective end that faces towards the axis of the shaft 1, at a small spacing from the path of movement along which the free ends of the bar-like permanent magnets 19 and 19' respectively can move when the permanent magnets are rotated about the respective shafts 20 and 20'. The consequence of this is that the bar-like permanent magnets 19 and 19' which in principle are freely rotatably preferably assume a starting position in which they are oriented radially towards the axis of the shaft and 'cling fast' to the soft-iron cores 22 and 22', by virtue of the magnetic field which the permanent magnets 19 and 19' induce in the cores.

The two energy storage and detector units 15 and 16 are so arranged that the inwardly facing end faces of the permanent magnets 19 and 19', when in their starting position, are disposed very close to a circular path of movement along which the free ends of a further bar-like permanent magnet 24 which is non-rotatably connected to the shaft 1 pass when the shaft 1 rotates.

An induction coil 25 is wound on to the soft-iron core 22 while the soft-iron core 22' does not carry any such coil. The shaft 20' which is non-rotatably connected to the permanent magnet 19' is extended upwardly in FIG. 2 and carries a permanent magnet 26 which is arranged in a position of being turned through 90° relative to the permanent magnet 20' disposed therebeneath. The permanent magnet 26 is also non-rotatably connected to the upwardly extended part of the shaft 20'. The permanent magnet 26 engages from below into a double-E-core 28 which is in the form of a hollow circular cylinder, the axis of the cylinder thereof coinciding with the axis of the shaft 20'. The side of the core 28 which is at the top in FIG. 2 is closed by an end portion 30 having two elongate, mutually parallel openings 31 and 32 which extend through to the interior of the core 28 and which enclose between them a limb portion 33. An induction coil 34 is wound on to the limb portion 33. Each of the two openings 31 and 32 communicates with a respective slot 35 and 36 which extends radially outwardly through the end portion 30 and which then extends along a generatrix over the entire axial height of the double-E core 28. In that way, the core 28 is practically divided into two halves which are separated from each other by an air gap and which are connected together only by way of the limb portion 33 which carries the induction coil 34.

Figure 3:
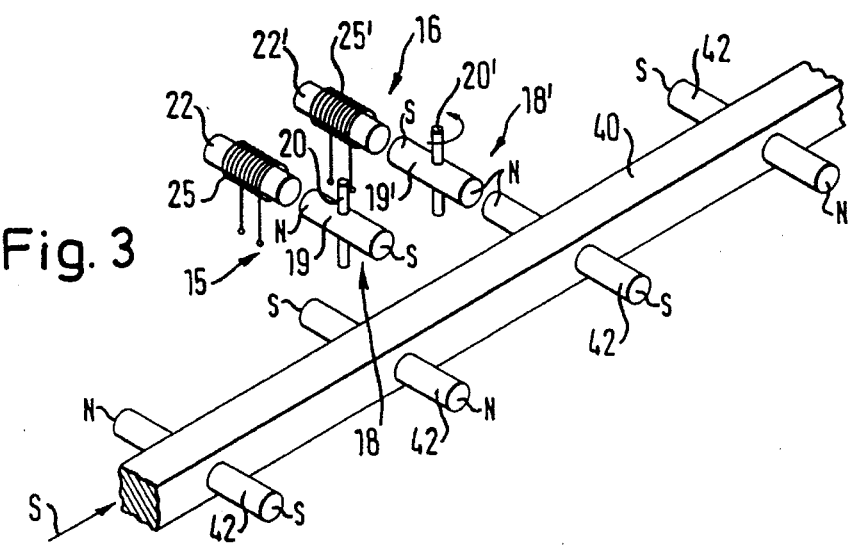
FIG. 3 is a diagrammatic view showing the structure of a position detector according to the invention which is suitable for monitoring a linear displacement and which has energy storage means which are again formed by respective magnet arrangements.

In the case of the energy storage and detection unit 15, the iron core 22, unlike the illustrated design, is preferably of an E-shaped configuration, as was described above in connection with FIG. 1. In this case also the E-shaped core is arranged in such a way that the free end face of its central limb is disposed as close as possible to the circular path of movement along which the ends of the bar magnet 19 pass when the bar magnet 19 rotates about the mounting shaft 20. It will be noted at this point that a corresponding consideration also applies in regard to all soft-iron cores which are shown in FIGS. 3 and 4 and which are illustrated in the form of cylindrical bars, only for the sake of simplicity of the drawing.

In order to explain the mode of operation of the revolution counter shown in FIG. 2, consideration will firstly be directed to the unit 15. In this respect, it is assumed that the bar magnet 19 is turned through 180° relative to the illustrated position so that its North pole points towards the axis of the shaft 1 and its South pole points toward the soft-iron core 22. It is also assumed that the bar magnet 24 which is non-rotatably connected to the shaft 1, upon a movement of the shaft 1 in the direction indicated by the arrow R, has not yet reached the position shown in FIG. 2 but is in a position which is rather more than 90° before that position, in which therefore its North pole is increasingly approaching the North pole of the permanent magnet 19. However, in spite of the increasing repulsion forces between those two poles, the permanent magnet initially remains in its position in which it is directed radially inwardly with its North pole because its South pole 'clings' to the iron core 22. In this case therefore the energy storage means for the storage of potential energy is formed by a magnet system which includes two elements, namely the soft-iron core 22 and the permanent magnet 19. The entrainment arrangement is once again also magnetic in nature. More specifically, as the North pole of the permanent magnet 24 increasingly approaches the North pole of the permanent magnet 19, the shaft 1 reaches an angular position in which the repulsion forces between those two North poles become greater than the attraction forces between the permanent magnet 19 and the soft-iron core 22.

At that moment the permanent magnet 19 is strongly accelerated for a rotary movement. In that situation, shortly after leaving the radially oriented starting position, not only the repulsion forces between its North pole and the North pole of the permanent magnet 24 but also the attraction forces between its South pole and the North pole of the permanent magnet 24 produce their effects. By virtue of that double effect of the forces involved, the permanent magnet 19 has attained a very high speed of rotation when it reaches the core 22 of the induction coil 25 and moves past it. As a result, in particular when the core 22 is of an E-shaped configuration in the above-described manner, the arrangement produces a high value of $d\phi/dt$, whereby a correspondingly high voltage is induced in the induction coil 25. The electrical energy pulse which is related thereto can be used in the same manner as has already been described hereinbefore with reference to the embodiment shown in FIG. 1.

When the necessary energy and the required signal have been delivered to the electronic evaluation assembly, the induction coil 25 is short-circuited by a switch (not shown) and, in that way, the rotary movement of the permanent magnet 19 is so heavily damped that its North pole moves only slightly past the end of the core 22, which is towards it, in order then for the permanent magnet 19 to return to the position shown in FIG. 2.

In this connection also, the important consideration is that the described rapid rotary movement is substantially independent of the speed at which the shaft 1 and the permanent magnet 24 connected thereto move to the predeterminable angular position. The magnetic energy storage means which is provided in this assembly takes a part of the kinetic rotational energy of the shaft 1, over a range of rotational movement which precedes the triggering position, and cumulatively stores that part of the kinetic rotational energy of the shaft 1, until the described rotary movement of the permanent magnet 19 is triggered off. Then, the stored magnetic energy is converted into kinetic energy which, as the North pole end of the permanent magnet 19 passes the core of the induction coil 25, is converted into electrical energy. In this embodiment therefore the permanent magnet which serves to store the magnetic energy is identical to the permanent magnet which serves to convert the kinetic energy imparted to the intermediate portion 18, into an electrical energy pulse.

The use of substances which undergo magnetic reversal corresponds to the above-described procedure. Those substances are substances with which, when a moving outside magnet has received a predetermined position, magnetic reversal occurs abruptly and all of a sudden. In this case the cumulated potential energy of the magnetic field is converted into kinetic energy of the reversing Weiss domains. The mechanical-macroscopic reversal of an entire permanent magnet in the intermediate portion is however to be preferred because it is almost loss-free and complete, and can be effected as often as may be desired. In addition it affords the advantage that, due to the low level of impedance, a substantially longer voltage pulse with a higher energy content is obtained.

When the shaft 1 rotates beyond the position shown in FIG. 2 through a further 90° in the direction indicated by the arrow R, the South pole of the permanent magnet 24 moves towards the South pole of the permanent magnet 19, which now faces radially inwardly, and, upon a continuation of that rotary movement, the same energy storage and liberation procedure as has just been described above takes place. The only difference is that the voltage pulses induced in the induction coil 25 have the opposite sign.

It will be noted however that it is not possible to ascertain whether, on moving past the core 22, the permanent magnet 19 is rotating in the clockwise direction, which would correspond to a rotary movement of the shaft 1 in the counter-clockwise direction, or whether the permanent magnet 19 is rotating in the counter-clockwise direction, which would correspond to a rotary movement of the shaft 1 in the clockwise direction. In order to permit the direction of rotation to be detected, the illustrated arrangement includes a second energy storage and detector unit 16 which is arranged at a position of being displaced through 90° relative to the above-described unit 15. The angle of 90° is not absolutely necessary but the angle may also be larger or smaller than 90°, as long as it is only markedly greater than 0° and markedly smaller than 180°. As already mentioned, the unit 16 may be of an identical design configuration to the unit 15.

In the embodiment actually shown in FIG. 2, as the North pole of the permanent magnet 24 approaches the North pole of the permanent magnet 19', the permanent magnet 19' also remains clinging to the non-rotatably mounted iron core 22'. When then, at a sufficiently high level of repulsion force, the above-described rotary acceleration takes place, the permanent magnet 26 which is disposed in the cup-shaped ferromagnetic double-E-core 28 and which is thus coupled to the permanent magnet 19' by way of the shaft 20' moves with a high level of acceleration over a comparatively large annular range, in which case its two poles pass over the respective gaps 35 and 36. At that moment, the magnetic flux induced in the coil 34 abruptly reverses so that once again a high level of dφ/dt is produced. In this embodiment therefore the permanent magnet 19' which serves essentially for magnetic energy storage and the permanent magnet 26 which serves essentially for converting the kinetic rotational energy into electrical energy are different from each other, even if they are mechanically non-rotatably connected together.

It will be appreciated that the sequence and polarity with which the voltage pulses successively occur at the outputs of the induction coils 25 and 34 also always clearly indicate the direction of a rotary movement with which one of the two ends of the permanent magnet 24 moves past the two energy storage and detector units 15 and 16. Even a reciprocating or swinging movement of the above-mentioned end of the permanent magnet 24 between the two units 15 and 16 can be detected in that way. If it is assumed that, when the arrangement is brought into operation, one or both of the permanent magnets 19, 19' faces or face inwardly towards the shaft 1, with a magnetic pole which is opposite to the magnetic pole of the permanent magnet 24, that first approaches the respective detector unit 15 or 16, then, unlike the above-described situation, there is an increasing attraction between those two poles. The result of this will be that, as the opposite pole of the permanent magnet 24 moves past, the inwardly facing pole of the permanent magnet 19 or 19' respectively moves somewhat with that pole of the permanent magnet 24. As that happens the attraction force decreases again, with increasing spacing. The permanent magnet 19 or 19' then turns back into its original position, without executing the above-described reversal procedure and without thus inducing a substantial voltage in the associated induction coil 25 or 34 respectively. Then however, with the direction of rotation remaining the same, the next pole that approaches it is the like pole of the permanent magnet 24 so that, after at least one complete revolution of the shaft 1 after the arrangement is brought into operation, the above-described functioning is guaranteed for each of the energy storage and detector units 15 and 16.

FIG. 3 shows a position detector according to the invention for monitoring a linear displacement. In this case the moving body is formed by a rod or bar 50 which is displaced with a reciprocating movement in the direction indicated by the arrow S. Transversely to the direction of displacement, the bar 40 carries a plurality of permanent magnets 42 which are disposed at regular spacings from each other and which are arranged in anti-parallel relationship with each other so that they face with alternate North and South pole ends towards the first and second energy storage and detector units 15 and 16 which are of a corresponding configuration as was described above with reference to FIG. 2 in relation to the unit 15 therein. In accordance with the present invention those two energy storage and detector units 15 and 16 in FIG. 3 may also be designed in the same manner as the unit 16 described with reference to FIG. 2.

In this case the spacing of the two units 15 and 16 in the direction of displacement of the bar 40 is a quarter of a period length, that is to say, a quarter of the spacing between two successive North poles or successive South poles of the permanent magnets 42. It will be appreciated that the mode of operation of the arrangement illustrated in FIG. 3 fully corresponds to that of the embodiment described above with reference to FIG. 2 so that there is no need for it to be described in detail again at this point.

Figure 4A:
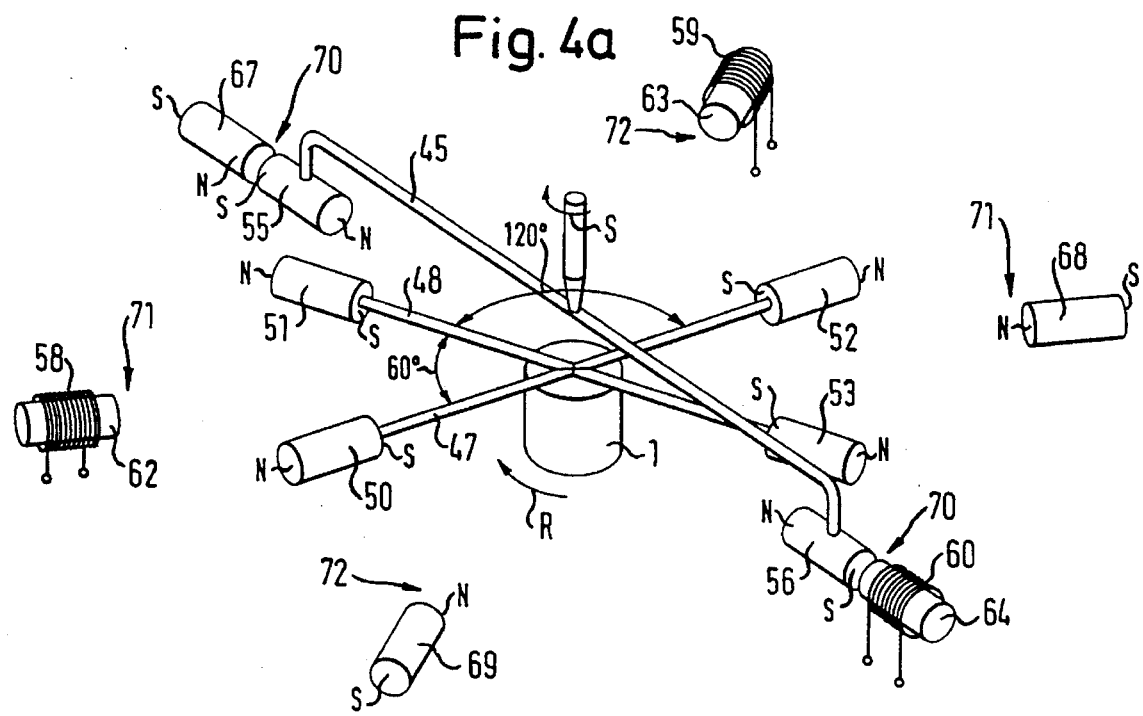
FIGS. 4a and 4b show two different positions of a further embodiment of a position detector according to the invention which is suitable for use as a revolution counter and which has an intermediate part whose axis of rotation coincides with the axis of the rotating shaft.
Figure 4B:
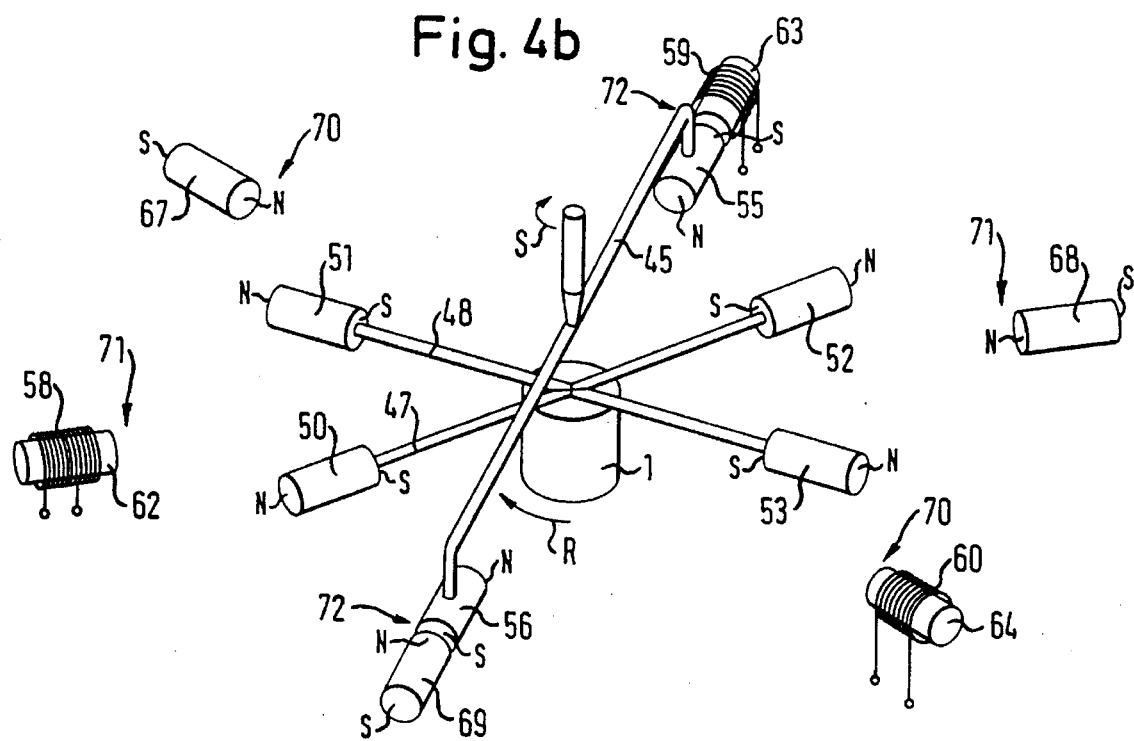

Reference will now be made to FIGS. 4a and 4b showing a further embodiment of the position detector according to the invention in the form of a revolution counter in two different positions, comprising an intermediate portion 45 which is mounted rotatably about an axis which is concentric relative to the axis of the shaft 1 constituting the moving body.

As can be clearly seen from FIGS. 4a and 4b, first and second bar-like carriers 47 and 48 are arranged on the upwardly facing end face of the rotary shaft 1, in such a way that the carriers 47 and 48 extend in radial directions relative to the axis of rotation of the shaft 1. The carriers 47 and 48 cross over each other in such a way that their point of intersection is on the axis of rotation of the shaft 1. The carriers 47, 48 in the illustrated embodiment include between themselves two mutually oppositely disposed angles each of 60°, and two mutually oppositely disposed angles each of 120°. At their outwardly facing free ends the carriers 47 and 48 each carry a respective permanent magnet as indicated at 50, 51, 52 and 53. Each permanent magnet 50 through 53 is also oriented radially with its North-South direction. The permanent magnets 50 through 53 lie on a circle which is concentric relative to the axis of rotation of the shaft 1 and all face outwardly with the same pole, in the illustrated case with their North pole.

The intermediate portion 45 which is arranged over the end face of the shaft 1 in FIGS. 4a and 4b is mounted rotatably, its axis of rotation coinciding with that of the shaft 1. It is also in the form of a bar-like carrier which extends radially relative to the axis of rotation of the shaft 1, along a diameter of a circle. At each of its two downwardly angled ends, the intermediate portion or carrier 45 carries a respective permanent magnet 55 and 56. The permanent magnets 55 and 56 have their North-South direction oriented radially. By virtue of the downward angular configuration of the ends of the intermediate portion or carrier 45, the permanent magnets 55 and 56, upon a rotary movement of the intermediate portion 45, can move along a circle which is in the same plane as the circle defined by the rotary movement of the permanent magnets 50 through 53, but which is of a diameter that is so much larger that the outwardly facing end faces of the permanent magnets 50 through 53 can move at a small spacing past the inwardly facing end faces of the permanent magnets 55 and 56. The North-South orientation of the permanent magnets 55, 56 is opposite to that of the permanent magnets 50 through 53, that is to say in the present case they have their North poles facing radially inwardly.

First, second and third induction coils 58, 59 and 60 are fixedly arranged at respective angular spacings of 120° in the same plane as paths of movement of the permanent magnets 50 through 53 and 55, 56, on a circle which is also concentric with respect to the axis of rotation of the shaft 1. The arrangement of the induction coils 58, 59 and 60 is such that their cores 62, 63 and 64 which are shown here in the form of circular cylinders extend in a radial direction relative to the axis of rotation of the shaft 1. Disposed in the same plane and on the same circle as the induction coils 58 through 60 are first, second and third permanent magnets 67, 68 and 69 which are each arranged at an angular spacing of 60° relative to the respective induction coils 58 through 60 and which are so oriented that their North-South direction extends radially relative to the axis of rotation of the shaft 1 and their inwardly facing poles are opposite to the outwardly facing poles of the permanent magnets 55 and 56 which are secured to the intermediate portion 45. The diameter of the circle on which the induction coils 58 through 60 and the permanent magnets 67 through 69 are fixedly disposed is such that, when the intermediate portion 45 rotates, the permanent magnets 55 and 56 can move with their outwardly facing end faces closely past the inwardly facing end faces of the induction coil cores 62 through 64 and the permanent magnets 67 through 69 respectively.

FIG. 4a shows the above-described arrangement in a position in which the intermediate portion or carrier 45 occupies a temporary rest position as its permanent magnet 55 'clings', with its outwardly facing South pole, to the inwardly facing North pole of the permanent magnet 67. A similar consideration also applies in regard to the oppositely disposed permanent magnet 56 of the intermediate portion 45 which is attracted, even if with a lower attraction force, by the ferromagnetic core 64 of the induction coil 60. Accordingly, in this case the energy storage means 70, 71 and 72 of which only the energy storage means 70 is active in FIG. 4a each comprise four elements, namely the movable permanent magnets 55 and 56 and a pair of mutually diametrally oppositely disposed ferromagnetic elements which are formed by the permanent magnets 67, 68 and 69 and the respectively associated iron cores 65, 62 and 63.

By virtue of the rotary movement of the shaft 1, which takes place in the direction indicated by the arrow R, the permanent magnet 51, with its outwardly facing North pole, increasingly approaches the inwardly facing North pole of the permanent magnet 55 while the outwardly facing North pole of the permanent magnet 53 moves toward the inwardly facing North pole of the permanent magnet 56.

Even if the rotary movement of the shaft 1 is very slow, the permanent magnets 51 and 53 will at some time reach a position in which the repulsion forces between them and the permanent magnets 55 and 56 become so great that the latter are released from their 'hole' by the permanent magnet 67 or the coil core 64 and are abruptly accelerated in the direction indicated by the arrow S. That acceleration effect is initially also enhanced by virtue of the fact that the outwardly facing South pole of the permanent magnet 56 moves toward the inwardly facing North pole of the stationary permanent magnet 69 and is attracted by same. A similar consideration also applies in regard to the permanent magnet 55 which, with an increasing approach movement, begins to induce in the ferromagnetic core 63 of the coil 59, a magnetic field which attracts it. The speed of the intermediate portion 45 which rotates because of the above-described acceleration effect reaches it maximum when the permanent magnet 55 passes the core 63 of the induction coil 59 and induces therein the desired voltage pulses. Because of the high speed of rotation, the permanent magnets 55 and 56 move past the core coil 63 and the permanent magnet 69 respectively and with their inwardly facing North pole, move towards the outwardly facing North poles of the permanent magnets 52 and 50 which, by virtue of the substantially slower rotary movement of the shaft 1, have only moved a short distance further along their circular path. Because the repulsion forces become greater as the permanent magnets increasingly move towards each other, the rotary movement of the intermediate portion 45 is braked and the permanent magnets 55 and 56 are not capable of moving past the permanent magnets 52 and 50. On the contrary, they reverse their rotary movement and return to the position shown in FIG. 4b. Depending on the extent to which their movement is damped, they also swing or oscillate somewhat about that position.

The above-described events are repeated when the shaft 1 continues to rotate in the direction of the arrow R so that, after a certain period of time, the permanent magnets 51 and 53 again approach the permanent magnets 55 and 56. In this case the energy storage means 72 then comes into operation. If the direction of rotation of the shaft 1 is reversed, then instead it is the permanent magnets 52 and 50 that approach the permanent magnets 55 and 56, and the above-described series of events takes place in the same manner but with the opposite direction of rotation.

It will be seen that the sequence in which the induction coils 58 through 60 output signals can again show the direction of rotation of the shaft 1, or indicate that the direction of rotation of the shaft 1 reverses within a short period of time, without a complete revolution having taken place.

With this arrangement, when the power supply for the electronic evaluation assembly is guaranteed and the shaft 1 is to rotate quickly and in a reaction-free manner, the carrier 45 can be pulled upwardly in the axial direction of the shaft 1 to such an extent that the permanent magnets 55 and 56 are no longer influenced to any perceptible degree by the permanent magnets 50 through 53. As a result of this, the energy storage means 70 through 71 are decoupled from the shaft 1 so that they can no longer take any kinetic energy therefrom to store it.

Reference will now be made to the embodiment of the invention shown in FIG. 5 which also provides that a permanent magnet 93 is non-rotatably connected to the shaft 1 and is oriented in such a way that its magnetic poles face radially outwardly. Furthermore, the FIG. 5 structure has a sensor and detector unit 95 which is also referred to hereinafter an energy converter and which has an intermediate portion 98 with a permanent magnet 99 non-rotatably connected to a shaft 100 which is rotatable about an axis that is parallel to the axis of the shaft 1.

The permanent magnet 99 is also so oriented that the line connecting its poles extends radially with respect to the shaft 100. The spacing between the shafts 1 and 100 and the radial lengths of the magnets 93 and 99 are such that the radial end faces of the magnets 93 and 99 can move closely past each other.

Looking at the radius which extends from the axis of the shaft 1 and on which the axis of the shaft 100 is disposed, arranged still further outwardly is an E-shaped soft-iron core 101 which is so arranged that the three limbs 102, 103 and 104 of its E-shape are oriented inwardly towards the shaft 1, preferably in mutually parallel relationship. The middle limb 103 is disposed precisely on the above-mentioned radius while the two outer limbs 102 and 104 are disposed a few degrees of angle in front of and behind the middle limb 103, as considered in the direction of rotation of the shaft 100. The spacing of the E-shaped core 101 from the shaft 100 is such that the end faces of the poles of the permanent magnet 99, when the magnet 99 rotates about the axis of the shaft 100, can move at a small spacing past the radially inwardly facing end face of the middle limb 103. There must be a larger spacing relative to the outer limbs 102 and 104 so that the permanent magnet 99 which in principle is freely rotatable preferably occupies a starting position in which it is oriented radially towards the axis of the shaft 1 and 'clings' to the soft-iron core 101, by virtue of the magnetic field which is induced by the permanent magnet 99 in the soft-iron core 101.

An induction coil 105 is wound on to the middle limb 103 of the soft-iron core 101 while the one outer limb 104 carries an auxiliary coil 106.

A further energy converter as indicated at 95' is formed by an E-shaped soft-iron core 101' which is also arranged in such a way that its limbs 102', 103', 104' are oriented inwardly towards the shaft 1, as was described hereinbefore in relation to the core 101.

In order to explain the mode of operation involved, attention is firstly directed to the energy converter 95. It is assumed in this respect that the permanent magnet 93 which is non-rotatably connected to the shaft 1, upon a movement of the shaft 1 in the direction indicated by the arrow R, has not yet reached the position shown in FIG. 5 but is at a position which is before that FIG. 5 position and in which therefore its North pole is increasingly approaching the North pole of the permanent magnet 99. In spite of the increasing repulsion forces between those two poles, the permanent magnet 99 initially remains in its position in which its North pole is directed radially inwardly because its South pole remains 'clinging' to the iron core 101. As the North pole of the permanent magnet 93 further approaches the North pole of the permanent magnet 99, then, before the position shown in FIG. 5 which actually never occurs as a stable position is reached, the shaft 1 reaches an angular position in which the repulsion forces between those two North poles become greater than the attraction forces between the permanent magnet 99 and the soft-iron core 101.

At that moment, the permanent magnet 99 is strongly accelerated for a rotary movement in the direction indicated by the arrow S. Shortly after leaving the radially oriented starting position, not only the repulsion forces between the North pole of the permanent magnet 99 and the North pole of the permanent magnet 93 but also the attraction forces between the South pole of the permanent magnet 99 and the North pole of the permanent magnet 93 take effect. As a result of that double force action, the permanent magnet 99 has reached a very high speed of rotation when its North pole end reaches the core 101 of the induction coil 105 and moves past same.

The result of this is that the magnetic flux from the permanent magnet 99 firstly passes into the iron core 101 through the outwardly disposed limb 102 of the iron core 101 and then passes out of the iron core 101 again essentially through the middle limb 103. The magnetic flux direction which is predetermined in that situation is abruptly reversed when the end face of the permanent magnet 99, which is towards the core 101, has travelled over the short arcuate distance between the outwardly disposed limb 102 and the middle limb 103. That produces a very high value of $d\phi/dt$, which for example generates a positive voltage pulse at the outputs of the induction coil 105. When then the end face of the permanent magnet 99 travels over the further short arcuate distance between the middle limb 103 and the other outwardly disposed limb 104 of the core 101, the magnetic flux direction in the core 101 again reverses so that now a negative voltage pulse of almost the same magnitude is induced.

When the end face of the permanent magnet 99 moves past the outer limb 104 of the E-shaped core 101, a voltage pulse is also induced in the auxiliary coil 106 which is wound on the limb 104. That voltage pulse is at least sufficient to supply the electronic evaluation assembly with a signal. The moment at which that signal occurs, prior to or after the current-voltage pulse in the induction coil 105, makes it possible to detect the direction of rotation of the permanent magnet 99 and therewith also the direction in which the shaft 1 rotated.

A swinging or oscillating movement of one of the ends of the magnet 99 in front of the limbs of the core 101 can also be detected in that way.

As soon as the induction coil 105 has outputted sufficient electrical energy to provide for signal evaluation and energy storage, its outputs can be short-circuited by a controllable switch (not shown) in the electronic evaluation assembly, or connected together with a comparatively low resistance. In that way, the rotary movement of the permanent magnet 99, which otherwise would last for a prolonged period of time, is so strongly damped that its North pole moves only a short distance past the end face of the core 101 which faces towards it, in order then for the North pole of the permanent magnet 99 to move back into a position which is turned through 180° relative to the position shown in FIG. 5.

The above-described fast rotary movement of the permanent magnet 99 is again substantially independent of the speed at which the shaft 1 and the permanent magnet 93 connected thereto move towards the predeterminable angular position, insofar as it does not fall below a minimum value. In this case also the invention provides an energy converter which, at extremely slow rotary movements of the shaft 1, takes a part of its kinetic energy and converts it into a current-voltage pulse of comparatively high power, which not only supplies the electronic evaluation assembly with a signal for counting the revolutions of the shaft but also delivers an electrical energy supply which guarantees operation thereof for a certain period of time.

Figure 5:
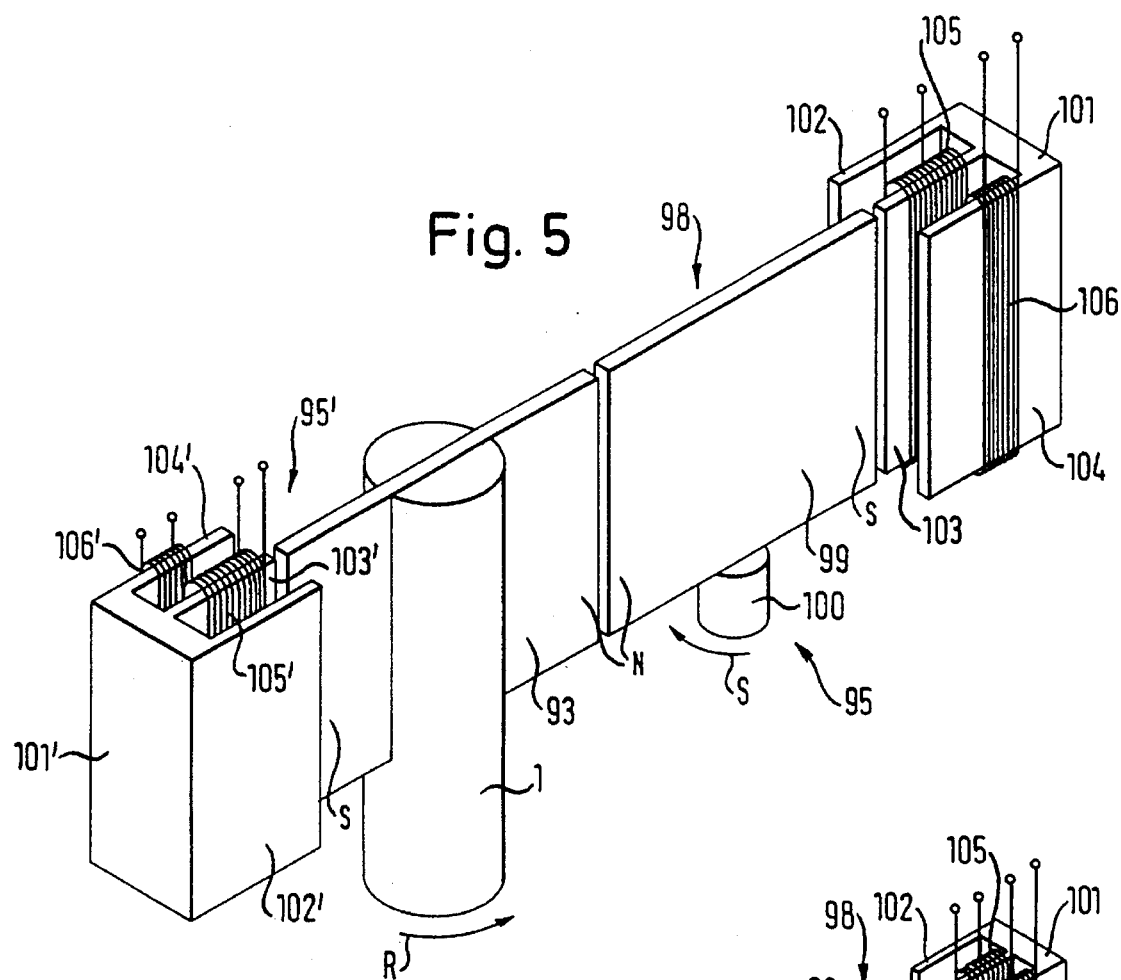
FIG. 5 is a diagrammatic perspective view of a position detector according to the invention with E-shaped soft iron cores.

When the shaft 1 rotates through a further 180° in the direction indicated by the arrow R beyond the position shown in FIG. 5, the South pole of the permanent magnet 93 moves towards the South pole of the permanent magnet 99, which is now facing radially inwardly. If that rotary movement is continued, the same energy conversion procedures as was described above takes place. The only difference is that the voltage pulses induced in the induction coils 105 and 106 are of opposite signs.

The energy converter 95' does not include the intermediate portion 98. Therefore, when the shaft 1 is rotating slowly, only weak current-voltage pulses are induced in the coils 105' and 106' which are wound on the E-shaped core 101', and those pulses are generally not sufficient as supplies of energy for the electronic evaluation assembly.

However the situation is different when the shaft 1 is rotating very fast. In that case it is possible that the permanent magnet 99 of the intermediate portion 98 may no longer be able to follow the movement of the shaft 1 and may possibly be almost stationary. In that case however the permanent magnet 93 moves past the soft-iron core 101' at such a high speed that a sufficiently high value of $d\phi/dt$ is produced in the coils 105' and 106', and the current-voltage pulses outputted by those coils are comparable to those described above in respect of the coils 105 and 106, and can be used in the same manner.

Figure 6:
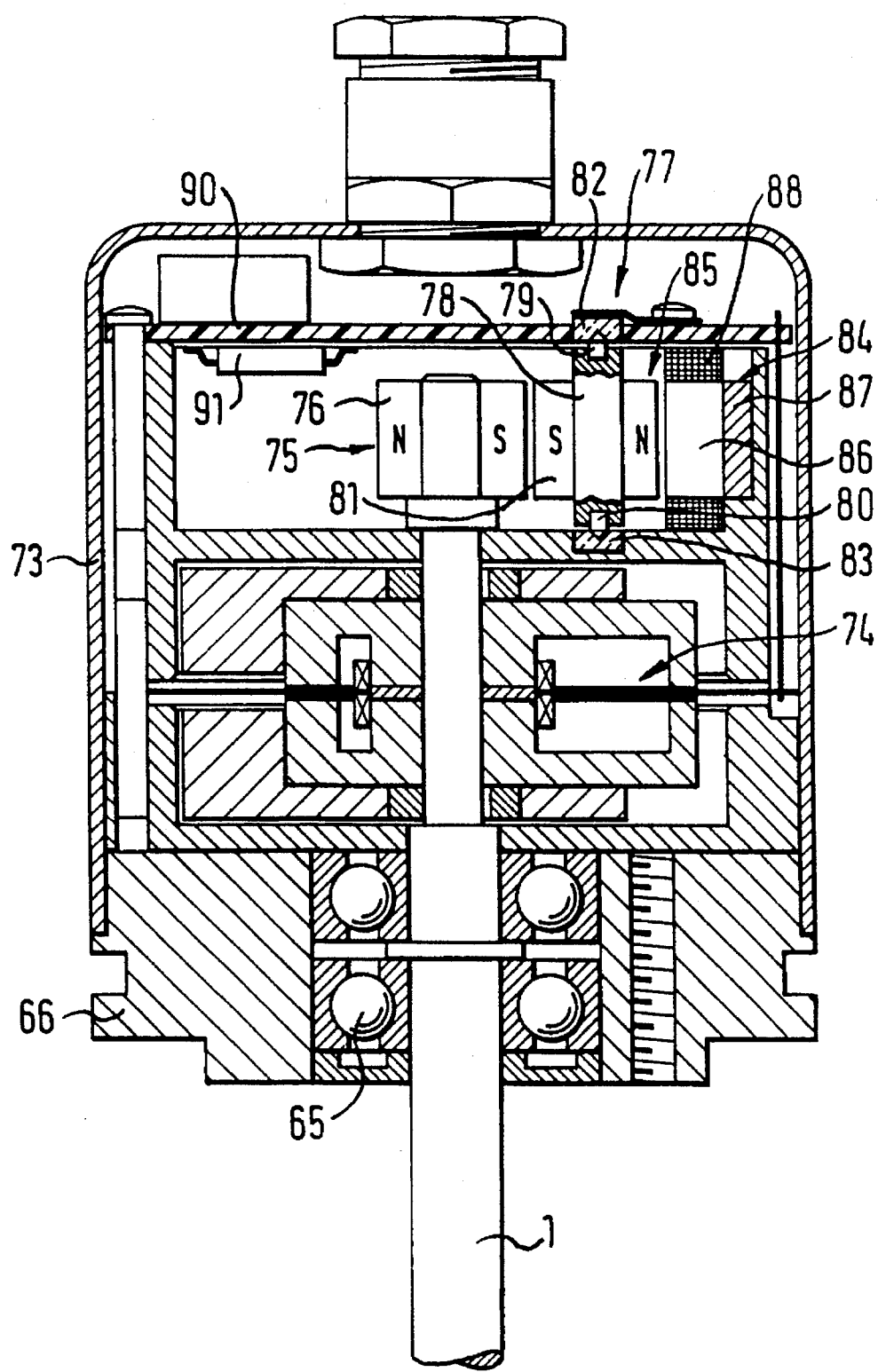
FIG. 6 is a sectional view through a practical embodiment of a position detector according to the invention which as a revolution counter in conjunction with an absolute angle sensor forms a multi-turn device.

FIG. 6 shows an actual embodiment of a revolution counter incorporating a position detector in accordance with the present invention. Reference numeral 1 again denotes a rotary shaft, while reference 66 denotes a base which is mounted on the free end of the rotary shaft 1 by means of a bearing assembly 65. The base 66 does not rotate with the rotary shaft 1. The base 66 carries a cup-shaped casing 73 which fits over the free end of the shaft 1. Disposed in the casing 73 is a high-resolution rotational sensor or pick-up 74, as is described for example in German patent specification No 41 13 745 to which attention is therefore suitably directed. Disposed is the upper region of the casing 73 is a position detector in accordance with the invention, as indicated at 75, which in principle is of a design configuration corresponding to the construction shown in FIG. 2. The essential difference here is that, in order to achieve a high value of $d\phi/dt$, the mass moment of inertia is minimized in order to be able to achieve high levels of acceleration and thus high speeds of rotation.

As can be seen from FIG. 6, at its upwardly pointing free end, the shaft 1 is slotted along a diameter which passes through its axis of rotation, and fitted into that slot from above is a permanent magnet 76 which is in the form of a small plate portion and whose North-South direction extends radially.

Reference 77 in FIG. 6 denotes generally an intermediate portion including a shaft 78 which is arranged eccentrically parallel to the shaft 1 at a small spacing and which is provided with a through slot for receiving a permanent magnet 81 which is again in the form of a small plate portion. The permanent magnet 81 is of small thickness perpendicularly to the plane of the drawing in FIG. 5, and it is also oriented radially with its North-South direction. At each of its ends the shaft 78 has a respective steel pin 79 and 80 which is press fit into the shaft 78. The shaft 78 is mounted by way of the steel pins 79 and 80 in respective ruby bearings 82 and 83. Shown at the right in FIG. 6 beside the North pole of the permanent magnet 81 are the middle limb 86 and the web portion 87, which is shown in section, of an E-shaped core 84. An induction coil 88 is wound on to the middle limb 86 thereof. In this embodiment, the energy storage means as indicated by reference 85 is formed by the permanent magnet 81 and the core 84, and the mode of operation of this assembly fully corresponds to that which was described with reference to FIG. 2. As, in the system shown in FIG. 6, the direction of rotation of the shaft 1 cannot be detected with only one energy storage and detector unit, the assembly has a second such unit which however is not visible in the illustrated sectional view, or an auxiliary coil, as was described with reference to FIG. 5.

Disposed above the upwardly pointing free end of the shaft 1 is a printed circuit board 90 on which is disposed the electronic evaluation assembly 91 which is supplied with signal pulses and electrical operating energy by the arrangement according to the invention. When the shaft 1 rotates at high speed, the intermediate portion 77 which includes the shaft 78 and the permanent magnet 81 is damped in terms of its rotary movement, by short-circuiting of the induction coil 88, in a defined manner or not at all, depending on the respective rotary speed of the shaft 1. As the intermediate portion 77 can rotate at very high speed, it is synchronized by suitable damping with the rotary movement of the shaft 1 and in principle can also be used to supply electrical energy to the electronic evaluation assembly 91, as the sole energy source.

It may be noted at this point that, in place of the illustrated steel-ruby bearing assemblies for supporting the shaft 78, it is also possible to use air bearings, ball bearings, or other bearings.

Figure 7:
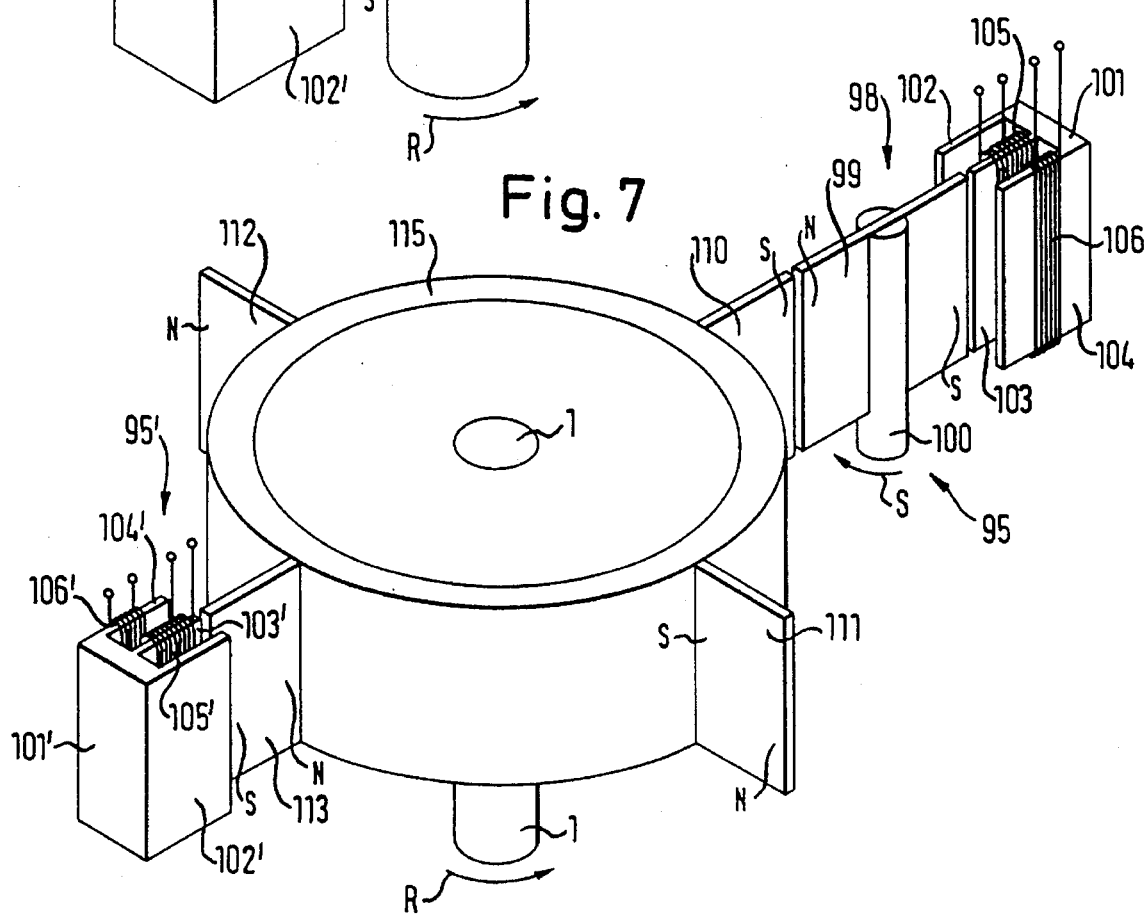
FIG. 7 is a perspective view of a position detector according to the invention which, upon passing through a plurality of different angular positions, supplies a current-voltage pulse associated with the respective angular position.

Reference is now made to FIG. 7 showing an embodiment which extensively corresponds to that shown in FIG. 5 so that there is no need at this point to describe again the parts which are identical and which are therefore also denoted by the same reference numerals. The essential difference between the FIG. 5 embodiment and the embodiment shown in FIG. 7 is that the rotary shaft 1, the motion of which is to be monitored, carried not one but four permanent magnets 110, 111, 112 and 113 which are each in the form of a small plate portion and which are arranged in pairs in diametrically opposite relationship in such a way that their North-South directions extend radially, as was described hereinbefore in relation to the permanent magnet 3 shown in FIG. 5. In the FIG. 7 embodiment the arrangement is such that, of the mutually oppositely disposed permanent magnets 110 and 113, the South poles are disposed radially outwardly, while in the case of the other pair of mutually oppositely disposed permanent magnets 111 and 112 which are arranged displaced through 90° relative to the first pair of permanent magnets 110 and 113, it is the North poles that face outwardly. As FIG. 7 shows, the permanent magnets 110 through 113 are mounted on the shaft 1 not directly but by way of a ferromagnetic ring 115 which provides a field line closure effect.

The mode of operation of the FIG. 7 structure is in principle the same as was described hereinbefore with reference to FIG. 5, except that in the case of the FIG. 7 construction a current/voltage pulse is generated at the respective energy converters 95 and 95', after each angular rotation through an angle of 90°. Therefore, when the shaft 1 rotates through a full revolution, the illustrated assembly gives not just two signal-energy pulses but four signal-energy pulses which are each spaced from each other through 90°. In that situation, the energy converter 95 with the movable intermediate portion 98 again serves for signal energy production, in the event that the shaft 1 is rotating only very slowly so that the value of $d\phi/dt$ produced in the energy converter 95' is not adequate. At high speeds of rotation, at least the signal pulses can then be obtained from the energy converter 95'.

The position of the rotatable permanent magnet 99 in FIG. 7 is precisely the opposite to that shown in FIG. 5. In other words, FIG. 7 shows a situation such as occurs after the permanent magnet 110 which is moving towards the energy converter 95 has, with its South pole, repelled the initially radially inwardly pointing South pole of the permanent magnet 99 and has caused it to experience an initially strongly accelerated rotary movement in the direction of the arrow S. As a result, as described hereinbefore in greater detail, the desired current/voltage pulses are induced by means of the E-shaped core 101 and the coils 105 and 106 which are wound thereon. In that respect, the North pole of the magnet 99, which after a rotary movement through 180° approaches the South pole of the magnet 110, is attracted by that South pole, but, because of its high speed of rotation, it has a tendency to move past same. In order to prevent uncontrolled rotary movement of the permanent magnet 99, it is possible for the winding 105 to be short-circuited by means of a switch (not shown), whereby the rotary movement of the permanent magnet 99 is damped in such a way that, after its North pole has briefly overshot the South pole of the permanent magnet 110, the permanent magnet 99 returns to the position shown in FIG. 7. If then the shaft 1 rotates through about 90° in the direction of the arrow R or opposite thereto, the North pole either of the permanent magnet 111 or the permanent magnet 112 approaches the North pole of the magnet 99 and again causes it to perform a rapid rotary movement which induces the desired current-voltage pulses.

If a still higher degree of resolution of the full circle of 360° is desired, then it is possible to mount more than the illustrated four permanent magnets 110 through 113 on the shaft 1. As an alternative thereto, it is possible to provide two or more further energy converters which are displaced relative to the energy converters 95 and 95', through angles which are different from 90°.

It has repeatedly been pointed out above that it is often desirable for the magnetically-induced and initially accelerated rotary movement of the permanent magnets of the intermediate portions 18, 18', 45, 77 and 98 in the respective arrangements described above to be damped, so that the assembly very rapidly adopts a new starting position which is turned for example through 180° relative to the previously adopted starting position and from which the permanent magnet of the respective intermediate portion can be attracted by an opposite pole of the magnet or magnets rotating with the shaft 1, to provide a new, accelerated rotary movement. That damping action may be provided not only be the above-mentioned and preferred method of short-circuiting the associated induction coil but also in another manner, for example using mechanical means.

It will be appreciated that the above-described structures according to the invention have been set forth solely by way of example and illustration of the principles thereof and that various modifications and alterations may be made therein without thereby departing from the spirit and scope of the invention.

It will further be noted at this point that the reference numerals contained in the appended claims serve for ease of interpretation thereof and are not intended to have restrictive effect.

What is claimed is:

1. A position detector for detecting the position of a moving body by generating an electrical pulse and feeding it to an electronic processing means whenever the moving body reaches a predeterminable position, comprising an energy storage means (2; 15, 16; 70, 71, 72; 85) operable when the body (1; 40) approaches the predeterminable position to accumulate a part of the kinetic energy of the body (1; 40) in the form of potential energy and store same and, when said position is reached, to abruptly liberate the stored potential energy in the form of kinetic energy, and a means (8, 12, 13; 19, 22, 25, 19', 26, 34; 55, 56, 58, 59, 60, 62, 63, 64; 84, 88) for conversion of said kinetic energy into an electrical energy pulse which is fed to the electronic processing means (91) which includes a storage means (6) for electrical energy, said storage means (6) being adapted to supply operating voltage for said electronic processing means (91) at least temporarily, and wherein a part of the electrical energy pulse is operable to charge said storage means (6).

2. A position detector as set forth in claim 1 wherein the energy storage means (15, 16; 70, 71, 72, 85) includes an intermediate portion (18, 18'; 45, 77) which is movable relative to the moving body (1; 40) and which experiences a high level of acceleration when the potential energy is suddenly liberated.

3. A position detector as set forth in claim 1 wherein the intermediate portion (18, 18'; 45; 77) has a very small moment of inertia.

4. A position detector as set forth in claim 2 including a means (11) for strongly decelerating the intermediate portion (18, 18'; 45; 77) when the desired voltage and charge have been fed to the electronic processing means (91).

5. A position detector as set forth in claim 2 including means mounting the intermediate portion (18, 18'; 45, 77) rotatably about an axis.

6. A position detector as set forth in claim 1 wherein, when the operating voltage of the electronic processing means can be maintained by means of outside energy, the energy storage means is decoupled from the movement of the moving body in such a way that it no longer accumulates and stores a portion of the kinetic energy thereof.

7. A position detector as set forth in claim 1 wherein the energy storage means (2) for the storage of potential energy include a spring means (4) which is adapted to be increasingly stressed when the body (1) approaches said predeterminable position and relieved of stress when said position is reached so that at leas a part of said spring means is abruptly accelerated.

8. A position detector as set forth in claim 1 wherein the energy storage means (15, 16; 70, 71, 72; 85) for the storage of potential energy includes a magnet means having at least first and second elements (19, 22, 19', 22'; 55, 56, 62, 63, 64, 67, 68, 69; 81, 84), of which one is formed by a permanent magnet (19, 19', 55, 56; 81) and the other (22, 22'; 62, 63, 64, 67, 68, 69; 84) comprises a ferromagnetic material.

9. A position detector as set forth in claim 8 wherein the element (67, 68, 69) which comprises ferromagnetic material is also a permanent magnet.

10. A position detector as set forth in claim 1 wherein the means for conversion of the kinetic energy into an electrical energy pulse includes an induction coil (12; 25, 34; 58, 59, 60; 88) and a permanent magnet (8; 19, 26; 55, 56; 81) which, when said stored potential energy is liberated, is adapted to be abruptly accelerated and then moved at high speed relative to the induction coil (12; 25, 34; 58, 59, 60; 88).

11. A position detector as set forth in claim 10 including an E-shaped core (84) having first, second and third arm portions and on which the induction coil (88) is wound, the permanent magnet (81) successively moving past said arm portions.

12. A position detector as set forth in claim 2 wherein the means for conversion of the kinetic energy into an electrical energy pulse includes an induction coil (12; 25, 34; 58, 59, 60; 88) and a permanent magnet (8; 19, 26; 55, 56; 81) which, when said stored potential energy is liberated, is adapted to be abruptly accelerated and then moved at high speed relative to the induction coil (12; 24, 34; 58, 59, 60; 88) and wherein said permanent magnet (19, 19', 55, 56; 81) is fixedly connected to the intermediate portion (18, 18'; 45; 77).

13. A position detector as set forth in claim 12 including means rotatably mounted said intermediate portion, wherein the intermediate portion (18') includes a shaft (20') and first and said permanent magnets (19', 26) which are arranged at a spacing from each other in the axial direction of the shaft (20') and are non-rotatably connected to the shaft (20'), one said permanent magnet (19') essentially forming part of said energy storage means and the other said permanent magnet (26) essentially forming part of the means for conversion of the kinetic energy into an electrical energy pulse.

14. A position detector as set forth in claim 13 including an induction coil (34) wound on to a cup-shaped double-E-core (28), said permanent magnet (26) being rotatable in the interior of said core after abrupt acceleration of the intermediate portion (18').

15. A position detector as set forth in claim 9 wherein the permanent magnet (19; 55, 56; 81) of the means for conversion of the kinetic energy into an electrical energy pulse is identical to the permanent magnet of the energy storage means.

16. A position detector as set forth in claim 1 wherein the electrical energy pulse is fed to the electronic processing means (91) in the form of a signal pulse.

17. A position detector as set forth in claim 1 in the form of a revolution counter, the moving body being formed by a rotary shaft (1).

18. A position detector as set forth in claim 5 in the form of a revolution counter, the moving body being formed by a rotary shaft (1).

19. A position detector as set forth in claim 18 wherein the axis of the intermediate portion (45) is concentric with respect to the axis of the shaft (1).

20. A position detector as set forth in claim 18 wherein the axis of the intermediate portion (18, 18'; 77) extends at least substantially parallel to the axis of the shaft (1) but does not coincide therewith.

21. A position detector as set forth in claim 18 wherein the axis of the intermediate portion extends at least substantially perpendicular to the axis of the shaft.

22. A position detector as set forth in claim 1 wherein the electrical energy pulses for the electronic processing means (91) form the sole energy source thereof.

23. A position detector as set forth in claim 2 including a return means which is formed by a spring means for returning the intermediate portion into a defined starting position after each deflection movement of the intermediate portion.

24. A position detector as set forth in claim 11 wherein the coil (105) which is operable to generate signal-energy pulses is wound on to the middle one of the first, second and third limbs (102, 103, 104) of the E-shaped core, and further including an auxiliary coil (106) which is wound on to at least one (104) of the outer limbs of the core, the signals generated by the auxiliary coil being adapted to detect the direction of the movement of the moving body to be monitored.

25. A position detector as set forth in claim 1 wherein the electrical energy storage means (6) comprises a capacitor means.

26. A revolution counter including a position detector as set forth in claim 1.

* * * * *